(No Model.) 2 Sheets—Sheet 1.
L. S. CLARK, O. G. FRANKS & G. T. BAUGHMAN.
TWO WHEELED VEHICLE.
No. 296,316. Patented Apr. 8, 1884.
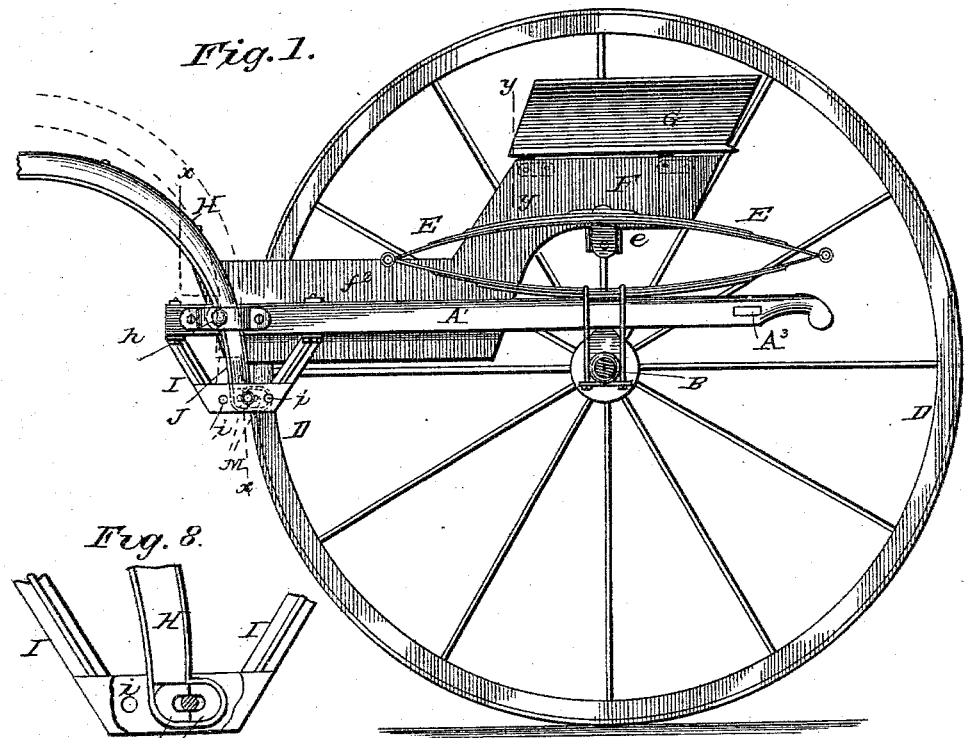
Fig. 1.
Fig. 3.
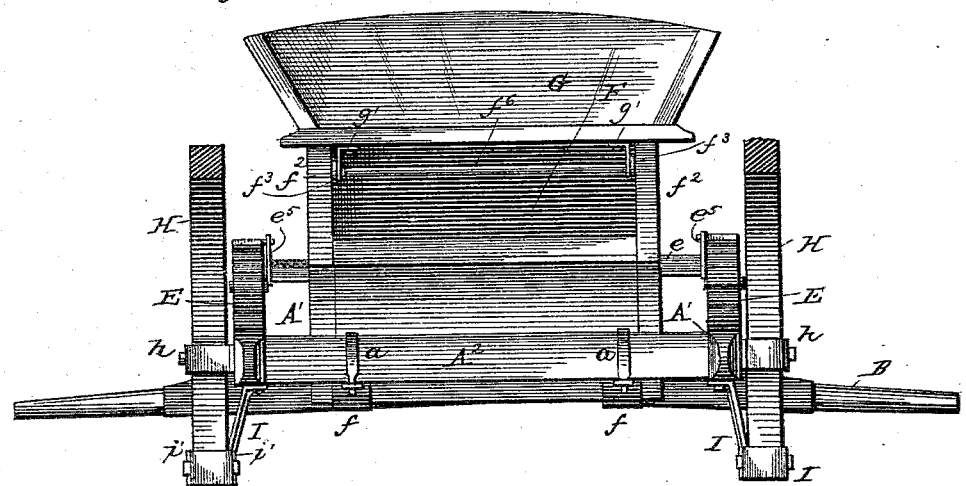
Fig. 2.
WITNESSES:
Fred. G. Dieterich
Wm. J. Littell
INVENTORS
L. S. Clark, O. G. Franks,
and G. T. Baughman,
by J. R. Littell, ATTORNEY.
N. PETERS. Photo-Lithographer, Washington, D. C.

(No Model.) 2 Sheets—Sheet 2.
L. S. CLARK, O. G. FRANKS & G. T. BAUGHMAN.
TWO WHEELED VEHICLE.
No. 296,316. Patented Apr. 8, 1884.
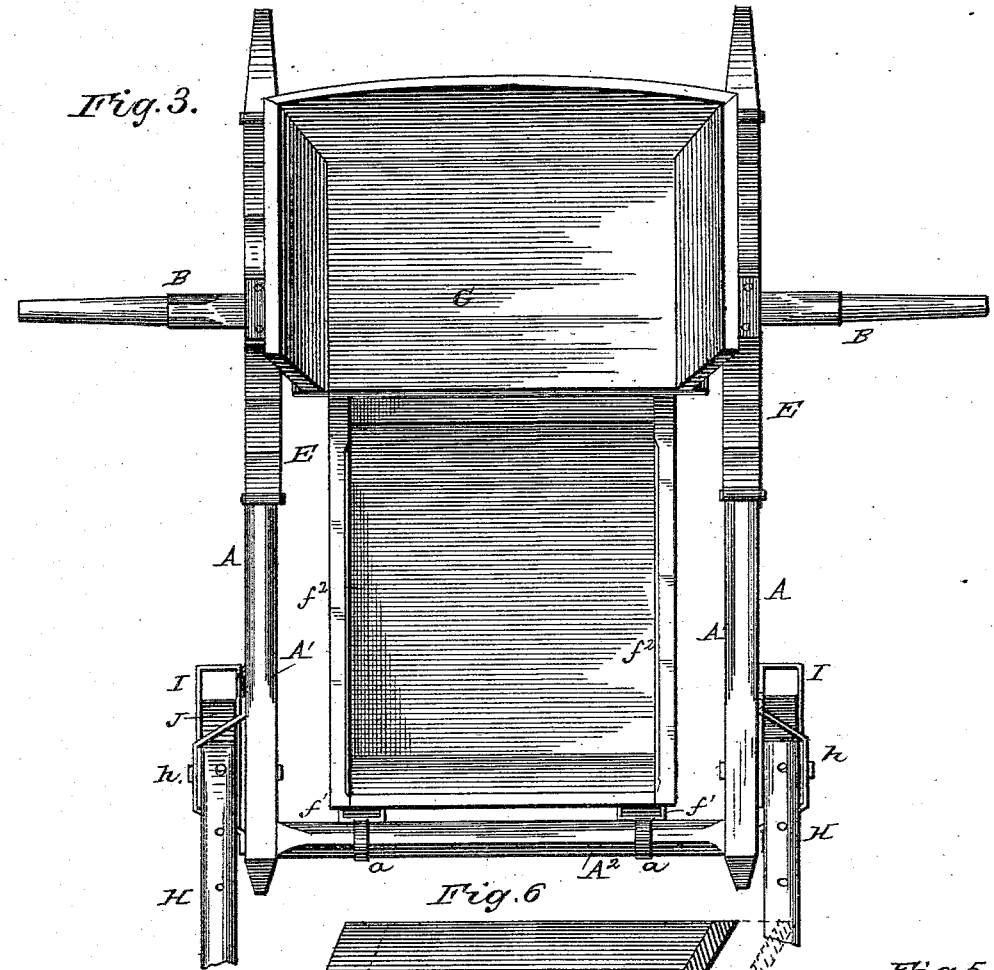
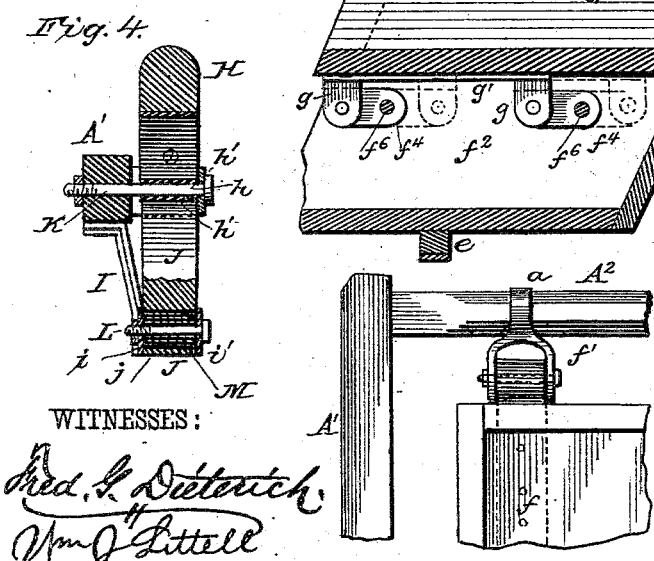
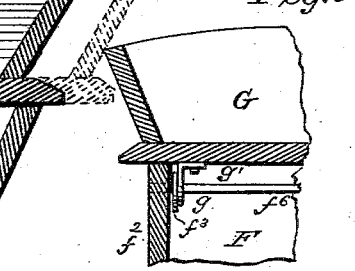

UNITED STATES PATENT OFFICE.

LEVI STARR CLARK, ORRIN G. FRANKS, AND GEORGE T. BAUGHMAN, OF DOYLESTOWN, ASSIGNORS TO THEMSELVES, AND JOHN H. WARREN, OF LODI, OHIO.

TWO-WHEELED VEHICLE.

SPECIFICATION forming part of Letters Patent No. 296,316, dated April 8, 1884.

Application filed November 30, 1883. (No model.)

*To all whom it may concern:*

Be it known that we, LEVI S. CLARK, ORRIN G. FRANKS, and GEORGE T. BAUGHMAN, citizens of the United States, residing at Doylestown, in the county of Wayne and State of Ohio, have invented certain new and useful Improvements in Two-Wheeled Vehicles; and we do hereby declare the following to be a full, clear, and exact description of the invention, such as will enable others skilled in the art to which it appertains to make and use the same.

This invention relates to that class of two-wheeled vehicles or sulkies which are designed to relieve the occupant from inconvenience by the motion of the horse during use of the vehicle.

The object of the invention is to provide a vehicle of this class possessing superior advantages in point of simplicity, inexpensiveness, durability, and general efficiency.

In the drawings, Figure 1 is a side elevation of a vehicle embodying our improvements. Fig. 2 is a front end view of the same. Fig. 3 is a top or plan view thereof. Fig. 4 is a detail vertical sectional view taken near the pivot of one of the thills on the line $x\,x$, Fig. 1. Fig. 5 is a detail vertical sectional view taken near the links of the seat on the line $y\,y$, Fig. 1. Fig. 6 is a longitudinal vertical sectional view taken through the seat portion of the body. Fig. 7 is a detail top view of one of the pivotal connections of the front portion of the body to the frame. Fig. 8 is a detail view of the eye of the thill-iron.

Referring to the drawings, A designates the frame of the vehicle, which is preferably rectangular, and comprises longitudinal side bars, $A'\,A'$, a transverse front bar, $A^2$, and a transverse rear bar, $A^3$. This frame is supported upon the axle B, which is disposed in rear of the central plane of the frame, and carries the wheels D D.

On the side bars, $A'\,A'$, just over the axle, are secured the springs E E, (of elliptical form,) which are connected by a top cross-piece, $e$, on which the rear or seat portion of the body F rests, as shown. By this arrangement it will be seen that the springs, being placed on the side bars of the frame, come at each side of the body, so that the latter depends between said springs, and is thus disposed at a lower plane than if the springs came under the body. The cross-piece $e$ is pivotally connected with the springs by depending links $e^5\,e^5$, as shown.

From the front end of the body project arms $f\,f$, which are pivoted, as at $f'$, to clips $a$ on the front bar, $A^2$. This pivotal support and connection of the front part of the body with the frame meets the longitudinal play of the body upon its pivotal connection with the springs E E, and effects a smooth and easy movement.

To the sides $f^2\,f^2$ of the body are pivoted link-plates $f^3$, their pivotal connection with the said sides being at one end, as shown at $f^4$, and by means of transverse bars $f^6\,f^6$, while to their other ends are pivoted the crank ends $g$ of bars $g'$, projecting from the seat G. These cranks $g'$ are arranged near the front and rear ends of the seat and at each side thereof, and they enable the seat to be shifted longitudinally in relation to the body to adjust the vehicle for the weight of one or two persons. This adjustment is accomplished by simply lifting the seat and throwing it over in the desired direction, as shown in dotted lines, Fig. 6, when the link-plates will turn on their pivots and permit the seat to rest upon the sides of the body, as before.

H H designate the thills, which have their ends secured in a shackle or bracket, I, depending from the side bars, $A'\,A'$, at the front end of the frame, and are pivotally connected, as shown at $h$, to the side bars, $A'$, above their ends. This pivotal connection is preferably effected by means of an eye, $h'$, formed in the thill-iron J, near its end and a cross-pin, K, passing through the bar $A'$ and this eye, as shown. The end eye, $j$, of the thill-iron is secured to the shackle by a cross-pin, L, passed through one of a series of perforations, $i$, in the said shackle and through the eye of the iron. By adjusting this pin in different ones of these perforations the front ends of the thills will be elevated or depressed, to suit a large or small horse, during which adjustment the pivot $h$ of the thills will serve as a fulcrum. This adjustment is illustrated by dotted lines, Fig. 1. The shackle preferably embodies two side-plates, $i'\,i'$, which inclose the end of the thill, and elastic cushions M M are preferably arranged in the enlarged eye $j$, so as to come in front and in rear of the pin L, to receive the action of the thill. By this pivotal connection of the thills the motion of the horse is broken, and is not imparted to the body of the vehicle.

The operation and advantages of our invention will be readily understood and appreciated. It is very simple and inexpensive, and can be readily adjusted and adapted for various circumstances of use. The occupants are relieved from inconvenience resulting from the motion of the horse, and at the same time no undue weights or strains are placed upon the horse.

We claim as our invention—

1. As an improvement in two-wheeled vehicles, the combination, with the frame, of the thills having their ends connected to the side bars of the frame at their front ends by a longitudinally-sliding bearing, and pivoted directly to the frame above and over this sliding bearing, substantially as set forth.

2. As an improvement in two-wheeled vehicles, the combination, with the frame of the vehicle, of brackets disposed on the same horizontal plane as the front ends of the side bars of the frame and depending therefrom, and the thills having their ends provided with a longitudinally-sliding bearing in the horizontal brackets, and also pivoted to the frame above and over the said brackets, substantially as set forth.

3. The combination, in a two-wheeled vehicle, with the brackets, of the thills pivoted to the frame of the vehicle, and having an elongated eye at their lower ends, and cross-pins engaging the eyes and the brackets, substantially as set forth.

4. The combination, with the frame of the vehicle having horizontal brackets depending therefrom and provided with elastic or spring devices, of the thills pivoted to the frame over the brackets, and having their ends retained between the said spring and acting in both directions against the same, substantially as set forth.

5. The combination of the frame, the thills pivoted thereto and having the thill-irons provided with the enlarged eye at their ends, the cross-pin passing through this eye, and cushions disposed in said eye at each side the said pin, substantially as set forth.

6. The combination of the frame, the brackets depending therefrom and comprising the side plates provided with perforations, the thills pivoted to the frame above the brackets and provided with an enlarged end eye inclosed between the plates of the brackets, the cross-pin passing through the perforations and the eye, and the cushions inclosed with the eye, substantially as set forth.

7. The combination, with the frame having depending brackets embodying side plates provided with a series of perforations, of the thills pivoted to the frame, and having the eye at their lower ends received within the said brackets, and a cross-pin, substantially as set forth.

8. The combination of the main frame supported at its rear portion upon the axle, the springs secured on the frame over the axle, the body supported at its front end on the frame, and thills pivotally connected with the front portion of the frame, and having their lower ends acting against springs or cushions, to equalize the weight on the springs, substantially as set forth.

9. The combination of the main frame supported at its rear portion upon the axle, the main springs secured on the frame over the axle, the body supported at its rear portion upon the springs and pivotally connected at its front portion to the frame, the depending shackles at the front end of the frame, and thills pivoted to the frame and having their ends connected to the shackles, substantially as set forth.

10. The combination, with the frame carrying the springs at its rear end and having the body supported on said springs and pivotally connected therewith, and with the shackles depending at the front end of the frame, of the thills pivoted to the frame and having their ends connected to the shackles, springs or cushions being provided at the sides of this connection to receive the action of the lower ends of the thills, substantially as set forth.

11. The combination, in a two-wheeled vehicle, with the sides of the body and the horizontal links pivoted thereto at one of their ends, of the seat resting upon the top edge of the said sides, and the vertical bars or links depending from the seat and pivoted to the free ends of the horizontal links, whereby the seat may be lifted and shifted by causing the horizontal links to turn over upon their pivots, substantially as set forth.

In testimony whereof we affix our signatures in presence of two witnesses.

LEVI STARR CLARK.
ORRIN G. FRANKS.
GEORGE T. BAUGHMAN.

Witnesses:
J. B. WEAVER,
T. S. SHEPHERD.